United States Patent [19]
Crue et al.

[11] Patent Number: 6,043,959
[45] Date of Patent: Mar. 28, 2000

[54] INDUCTIVE WRITE HEAD FORMED WITH FLAT YOKE AND MERGED WITH MAGNETORESISTIVE READ TRANSDUCER

[75] Inventors: Billy Wayne Crue, San Jose; Mark D. Thomas, Hollister; Eric Katz, San Jose; William Jensen, Fremont, all of Calif.

[73] Assignee: Read-Rite Corporation, Milpitas, Calif.

[21] Appl. No.: 09/046,796

[22] Filed: Mar. 23, 1998

[51] Int. Cl.[7] ................................................ G11B 5/39
[52] U.S. Cl. ................................................ 360/113
[58] Field of Search .................................. 360/113, 126

[56] References Cited

U.S. PATENT DOCUMENTS 5,325,254  6/1994  Cooperrider ............................ 360/126

*Primary Examiner*—A. J. Heinz
*Attorney, Agent, or Firm*—Nathan N. Kallman

[57] ABSTRACT

A magnetic head includes aligned pole tips and a coil proximally disposed between a pair of first and second magnetic yoke layers which define a closed magnetic path with a transducing gap. The second magnetic yoke layer includes a flat geometry with a substantially level cross-sectional profile. The second yoke layer with less curvature results in less mutual inductance with the coil. Furthermore, the coil can be closely positioned between the first and second yoke layer, thereby allowing the coil to be more efficient in inducing magnetic flux in the yoke layers during data writing, and allowing the intercepted flux to induce current into the coil during data reading if the magnetic head is used as an inductive head.

17 Claims, 16 Drawing Sheets

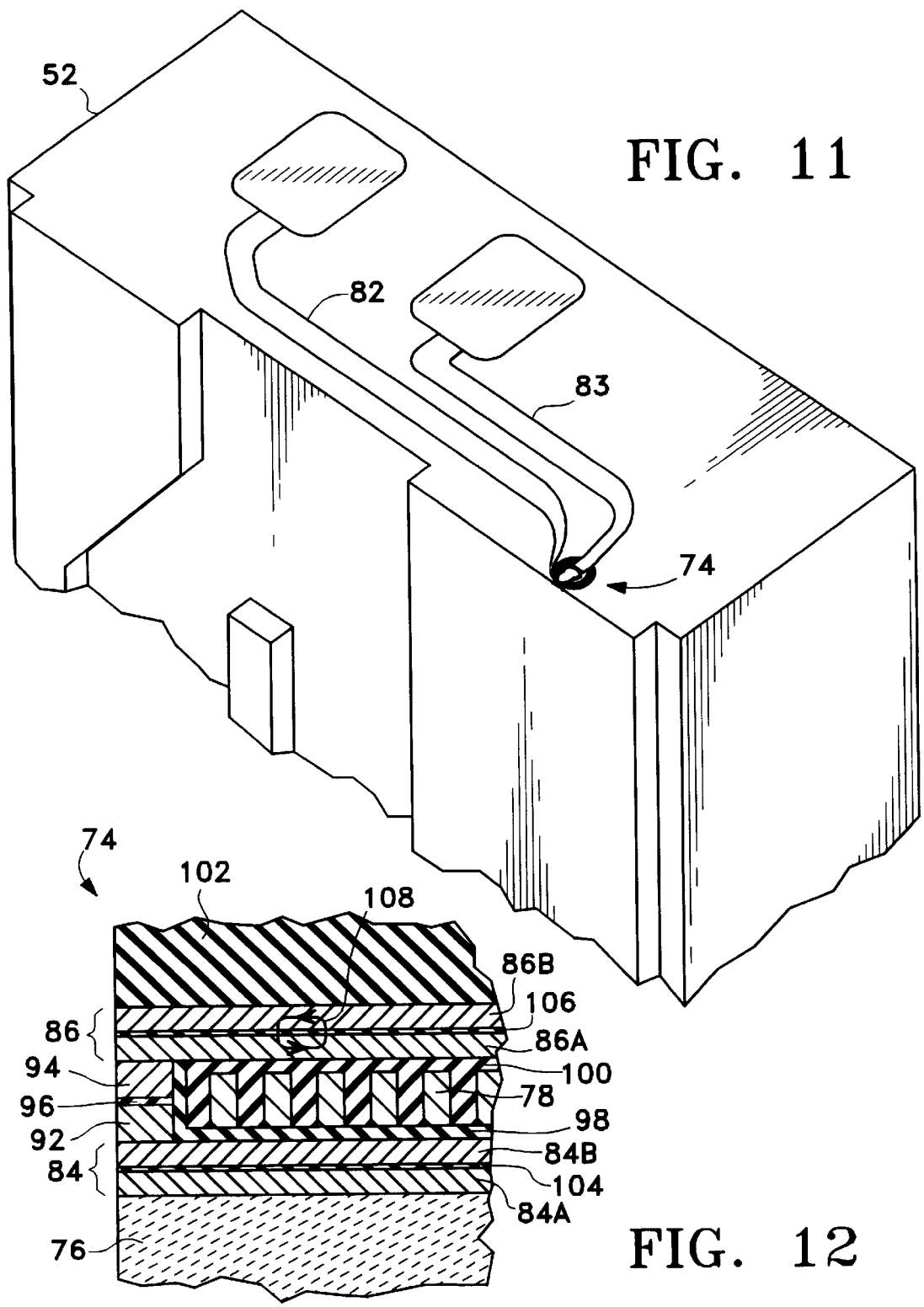

FIG. 18A
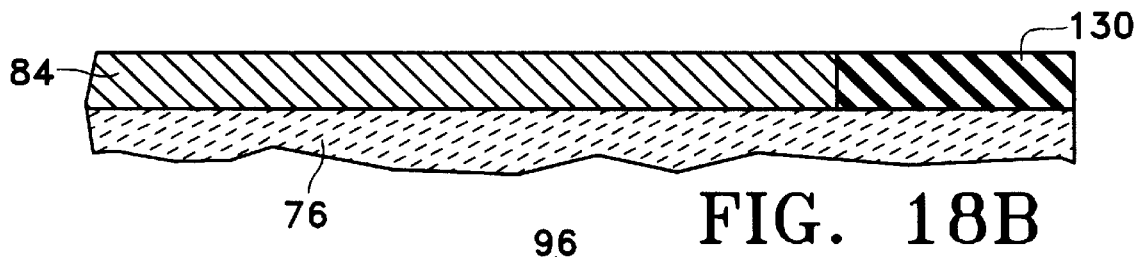
FIG. 18B
FIG. 18C
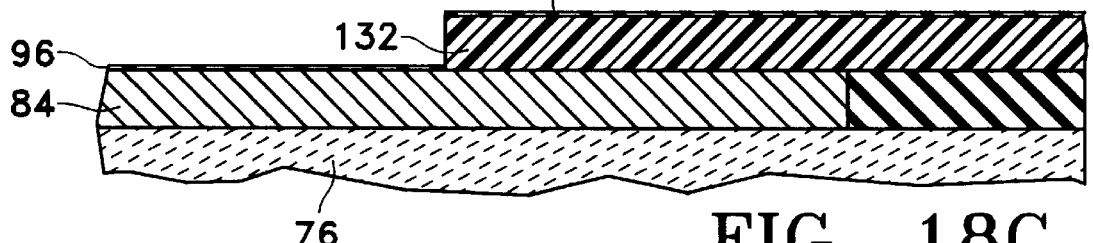
FIG. 18D
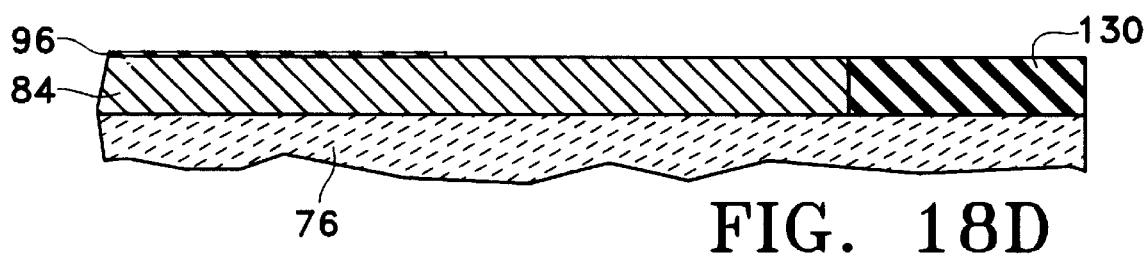
FIG. 18E
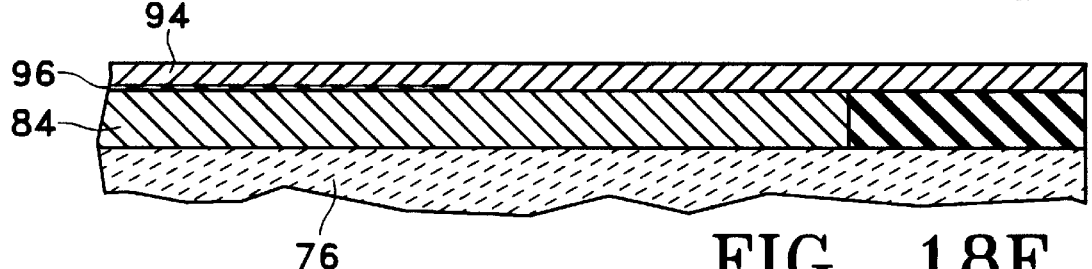
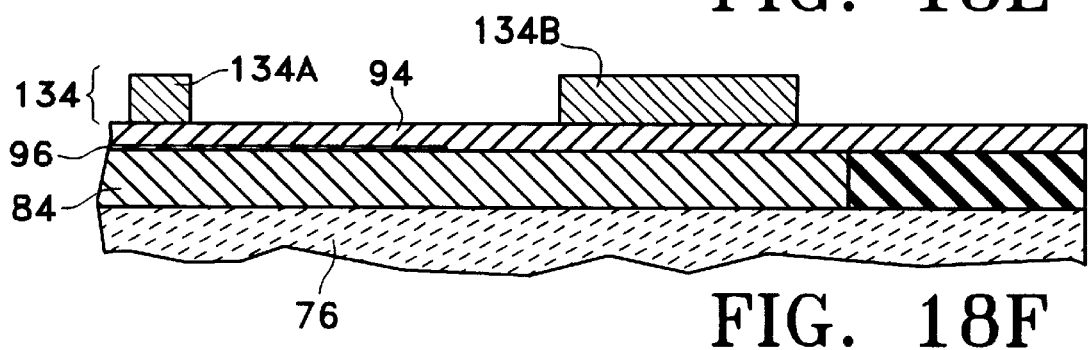
FIG. 18F

INDUCTIVE WRITE HEAD FORMED WITH FLAT YOKE AND MERGED WITH MAGNETORESISTIVE READ TRANSDUCER

FIELD OF THE INVENTION

This invention relates to magnetic heads and in particular to an improved write head suitable for writing at high areal densities and transferring data at high rates.

BACKGROUND OF THE INVENTION

New computer applications such as multimedia and other storage intensive applications require high areal densities and data transfer rates, but the performance of present magnetic write heads is limited by several effects which degrade performance at corresponding higher frequencies.

For example, the relatively high inductance of the write portion of current merged inductive write and magnetoresistive ("MR") heads, typically 100 to 150 nH, limits the speed at which the write current can be switched using present power supply voltages (5 to 8 volts). As a result, such heads are limited to data transfer rates of from 100 to 150 Mbits/sec.

In addition, the so-called "skin effect" becomes more significant at higher frequencies and limits typical head performance. This effect confines the magnetic flux to the outer surfaces of the magnetic layers of the device, such as the yokes and poles. This reduces magnetic efficiency, i.e., writing field per unit of write current used, and leads to premature magnetic saturation of the head. The latter effect causes problems with overwrite and non-linear transition shift ("NLTS").

As data rates increase, the time interval associated with each bit being stored on the media decreases. The write current passing through the write coil of the writing head must be switched from a positive write current value to a negative write current value well within the time interval associated with each bit. An approximate relationship between a maximum time allowed to switch this current as a function of a desired or selected data rate is shown in FIG. 1. The curve shown corresponds to allowing fifty percent (50%) of the data timing interval for write current switching, a typical value in the disk drive industry. As an example, a 500 Mbit/sec. data rate would require the current to be switched within a maximum time interval of about 1.1 nanoseconds, while 800 Mbits/sec. would require a maximum time of about 0.7 nanoseconds.

FIG. 2 summarizes a sample set of calculations for the actual write current waveform as a function of total head assembly inductance, which consists of the head inductance and any additional inductance associated with the leads. These particular calculations correspond to a circuit power supply voltage of 5 volts, which is common in the disk drive industry and a write current value of 35 mamps. Higher values of write current, as are sometimes required, would result in even longer risetimes that the values shown in FIG. 2.

FIGS. 1 and 2 clearly show that the trend towards higher data rates requires shorter and shorter write current switching times, which thereby requires lower and lower values of head inductance.

One present high performance write head is disclosed in U.S. Pat. No. 5,285,340, Ju et al., entitled "The Thin Film Magnetic Write Head with Conformable Pole Tips", issued Feb. 8, 1994, which describes a magnetic head with pole tips having vertically aligned sidewalls. As shown in FIG. 2, a magnetic head 12 includes first and second pole tips 14 and 16 of the respective first and second yoke layers 18 and 20. The magnetic head 12 is formed by first depositing the first yoke layer 18 onto a nonmagnetic substrate 22. A photoresist layer 24 is then spun atop the first yoke layer 18. An opening with vertically aligned inner sidewalls is formed within the photoresist layer 24. The first pole tip layer 14, the gap layer 26, and second pole tip layer 16 are sequentially deposited into the photoresist opening. After selective removal of the photoresist layer 24, the second yoke layer 20 is formed over the second pole tip layer 16. The magnetic head 12 of Ju et al. includes a coil layer 28 disposed on top of the photoresist layer 24. The elevated coil layer 28 necessitates the second yoke layer 20 to be formed with a curved profile. The curved second yoke layer 20 is undesirable for device fabrication and performance, as explained below.

One such fabrication problem is that of step coverage. As illustrated in FIG. 4, in a thin film structure 29, a second metallic layer 30 is deposited above a first metallic layer 32 separated by an insulating layer 34. The second metallic layer 30 must cover a large curvature profile defined by the underlying insulating layer 34. During deposition of the second metallic layer 30, the depositing material has a tendency to evenly distribute onto the depositing surface. As a consequence, the thickness of parts of layer 30 is very thin such as an area 36A, above the insulating layer 34. A similar condition exists in depositing the insulating layer 34 above the first metallic layer 32. That is, the larger the curvature profile of the deposited layer, the higher is the probability of exposing the deposited layer with areas of material weakness, such as the area 36B shown in FIG. 4. If the area with material deficiency occurs in the second metallic layer 30, there may be an open circuit. If the area of thinner material happens in the insulating layer 34, there may be an electrical short bridging the overlying and underlying layers 30 and 32. If the second metallic layer 30 is a second yoke layer, such as the layer 20 in the magnetic head 12 shown in FIG. 3, it may result in a malfunctioning head. Accordingly, in the fabrication of thin film write heads, excessive step coverage problems reduce final production yield and consequently increase manufacturing costs.

Another fabrication problem of typical heads is the difficulty of controlling the distance between the bottom of the layers 18 and 20 (FIG. 3), i.e., facing the media, and the portion of the second yoke layer 20 that curves away from the substrate 22. This distance is called the throat height and is generally desired to be formed as short as possible for the head to write with maximum magnetic field. However, if the throat height is lapped too short during processing, the gap may open and the head is nonfunctional. One means of minimizing the sensitivity of the head performance to final lapped throat height to processing is to use first and second pole tip layers 14 and 16.

Moreover, in Ju et al., the second yoke layer 20 with a high curvature profile also increases the inductance of the magnetic head 12. The reason is that the highly curved second yoke layer 20 unnecessarily lengthens the magnetic path. The longer the magnetic path, the higher is the inductance. As mentioned before, a magnetic head with yoke layers having high inductance is slow in responding to writing current and incapable of performing high rate data transfer onto media with high areal densities.

It should also be noted that disclosed in the '340 patent is a single layer coil 28. Magnetic heads are now fabricated on microscopically confined areas with limited heat dissipation capacity. Due to the inherent large inductance of the second yoke layer 20 and to increase the sensitivity of the magnetic head without injecting excessive current into the inductive coil, the number of coil windings are accordingly increased. To maintain the small physical size for a magnetic head, the coil layers are normally stacked together. The laying of additional coil layers would require additional profile curvature and exacerbate the problems explained above.

Another present high performance write head is disclosed in U.S. Pat. No. 5,438,747, Krounbi et al., entitled "Method of Making a Thin Film Merged MR Head with Aligned Pole Tips", issued Aug. 8, 1995, and is shown as magnetic head 30 in FIG. 5. The vertically aligned sidewalls of the first and second pole tips 32 and 34 are fabricated by the process of ion milling. As with the magnetic head 12 of Ju et al., the coil layer 36 of Krounbi et al. is disposed above the gap layer 38. This arrangement also results in a tall stack height covered by a highly curved second yoke layer which results in the problems explained above.

It is an object of the invention to overcome the limitations of the present thin film write heads, such as those described previously, to provide a write head that can operate at high data transfer rates. Further, it is an object to provide a head with low inductance and high magnetic efficiency. Additionally, it is an object to avoid premature magnetic saturation of the head.

SUMMARY OF THE INVENTION

It is an object of the invention to provide a magnetic head capable of writing narrow data tracks with high linear recording densities.

It is another object of the invention to provide a magnetic head having very low inductance to improve high frequency performance.

It is another object of the invention to provide a magnetic head with improved magnetic efficiency operation at high frequencies.

It is another object of the invention to provide a magnetic head having a reduced sensitivity of the maximum write field to the throat height of the head.

It is yet another objective of the invention to provide a magnetic head with ease in fabrication, and which involves no special tooling thereby allowing low manufacturing costs.

The magnetic head of the invention includes aligned pole tips, and a coil proximally disposed between a pair of first and second magnetic yoke layers which define a closed magnetic path. The second magnetic yoke layer comprises a flat geometry with a substantially level cross-sectional profile.

In another embodiment, the magnetic head is built as a merged head including a magnetoresistive read transducer fabricated adjacent to the inductive coil with is sandwiched between two yoke layers with flat geometries.

The fabrication of the inventive magnetic head involves no unique tooling or processing and begins by forming a stack of layers on a substrate. The stack of layers is then etched through a common mask, resulting in the stack of layers formed on the substrate with aligned sidewalls. A thin insulating layer is deposited onto the stack of layers and the substrate. A coil is then formed above the substrate adjacent to the stack of layers. A second insulating layer is deposited to cover over and around the coil and the stack of layers. The second insulating layer is then planarized to a level surface with the stack of layers exposed. An overlying yoke layer is then deposited onto the level surface. The yoke layer thus formed assumes a flat geometry. As a consequence, the step coverage problem of any additional overlying layers is significantly alleviated.

These and other features and advantages of the invention will be apparent to those skilled in the art from the following detailed description, taken together with the accompanying drawings, in which like reference numerals refer to like parts.

BRIEF DESCRIPTION OF THE DRAWINGS

FIG. 11 is a perspective view, partially broken away, showing the magnetic head of the invention fabricated on a slider slidable above the surface of a storage medium;

FIG. 12 is a cross-sectional partial side view of a variation of the magnetic head shown in FIGS. 7–11 implemented with laminated yoke layers;

DETAILED DESCRIPTION OF THE INVENTION

Figure 6:
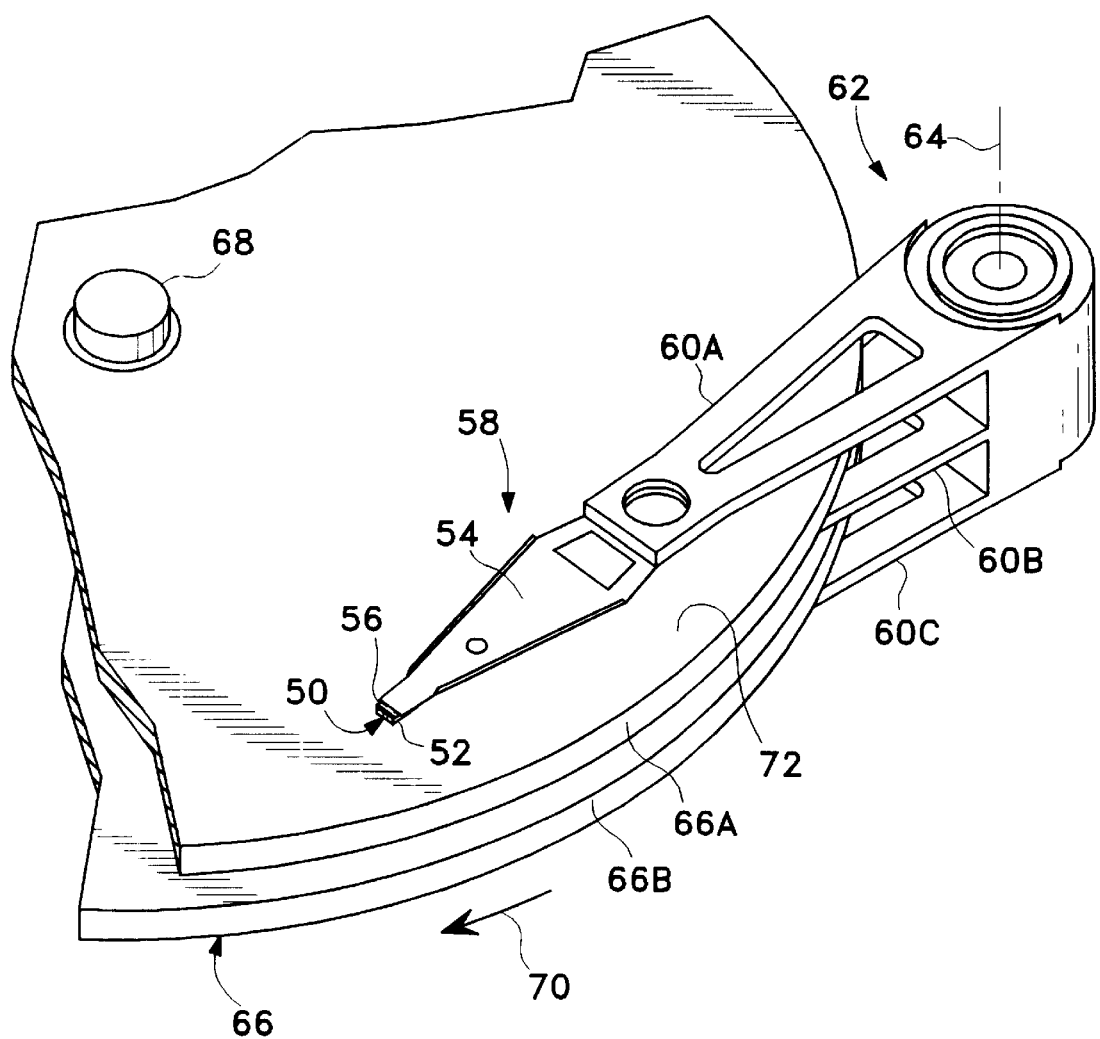
FIG. 6 is a perspective view, partially broken away, illustrating an exemplary use of the magnetic head of the invention.

FIG. 6 describes a magnetic head that is affixed to a slider 52 which in turn is attached to a load beam 54 through a flexure 56. The slider 52, the flexure 56, and the load beam 54 are collectively called a gimbal assembly 58 which is attached to an actuator arm 60A of an arm assembly 62 rotatable about an axis 64. A stack of spaced apart disks 66 is rotatable about a common spindle 68. The actuator arm assembly 62 includes a plurality of actuator arm branches 60A–60C which extend into the spacings between the disks 66A and 66B.

During normal operation, the disks 66A and 66B spin at high speed in the direction 70 about the spindle 68. The aerodynamic cushion of the moving air between the slider 52 and the disk surface 72 provide sufficient lift to suspend the slider 52 above the disk surface 72 of the disk 66A, for example. On the other hand, the spring forces of the load beam 54 and the resilient flexure 56 move the slider toward the disk surface 72. An equilibrium point is reached where the slider 16 flies over the disk surface 72 at a substantially constant flying height.

Figure 7:
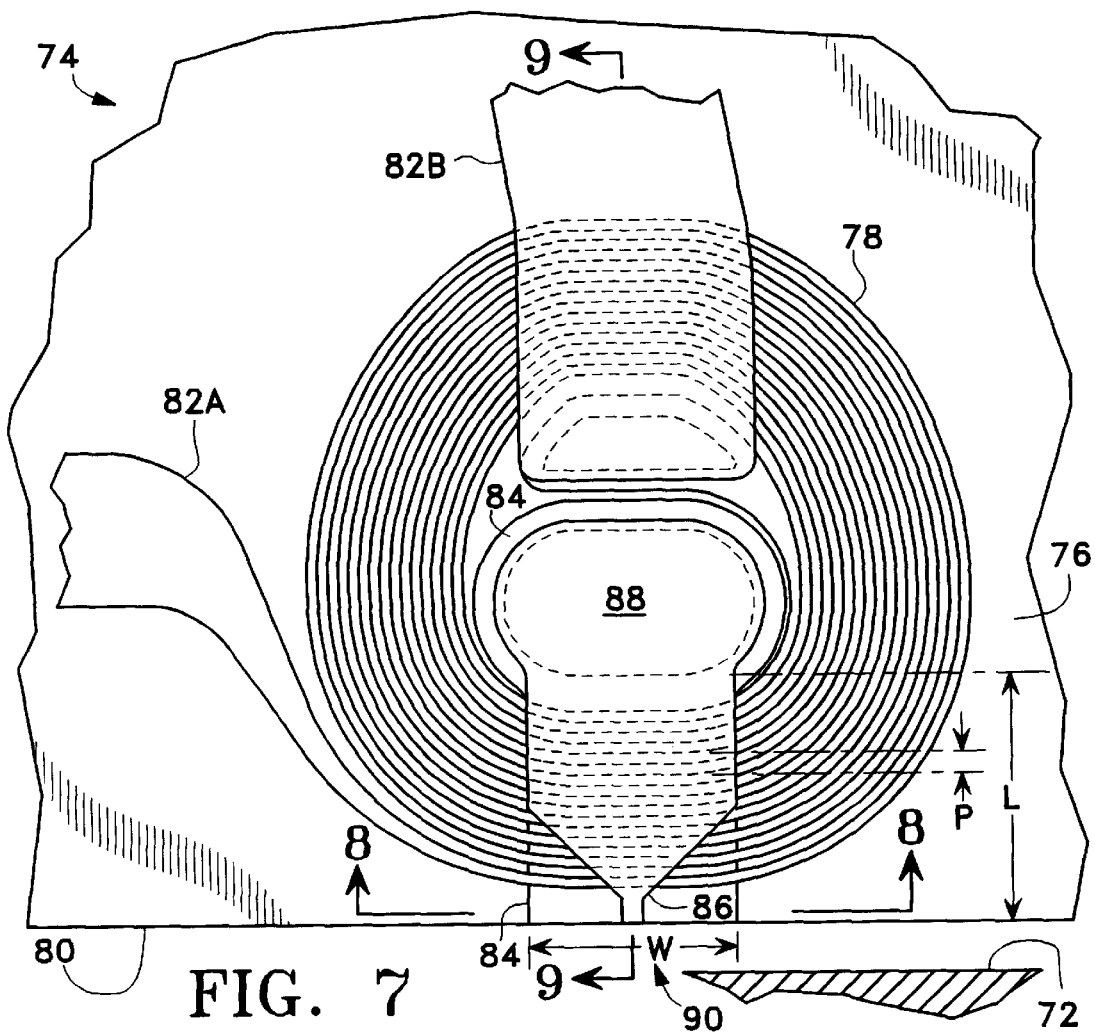
FIG. 7 is a top plan view of the first embodiment of the magnetic head of the invention.
Figure 8:
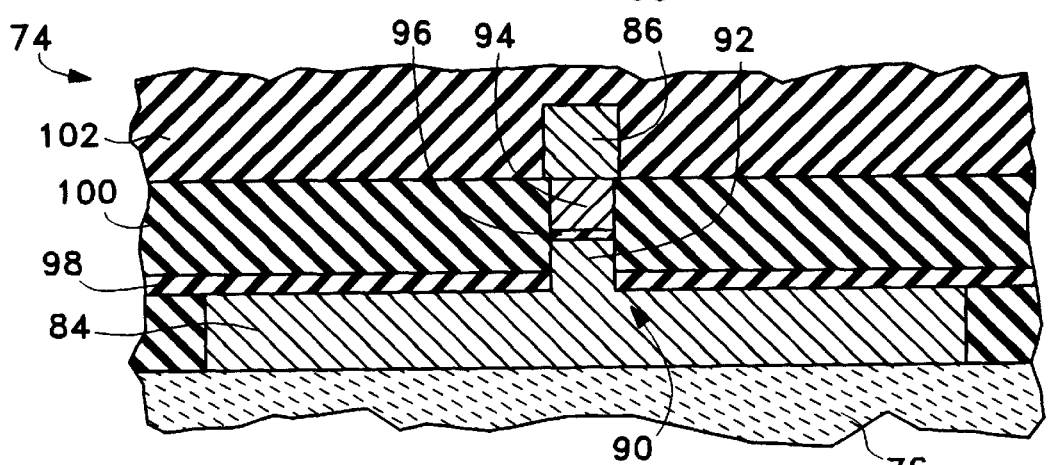
FIG. 8 is a cross-sectional front view taken along the line 8—8, of FIG. 7.
Figure 9:
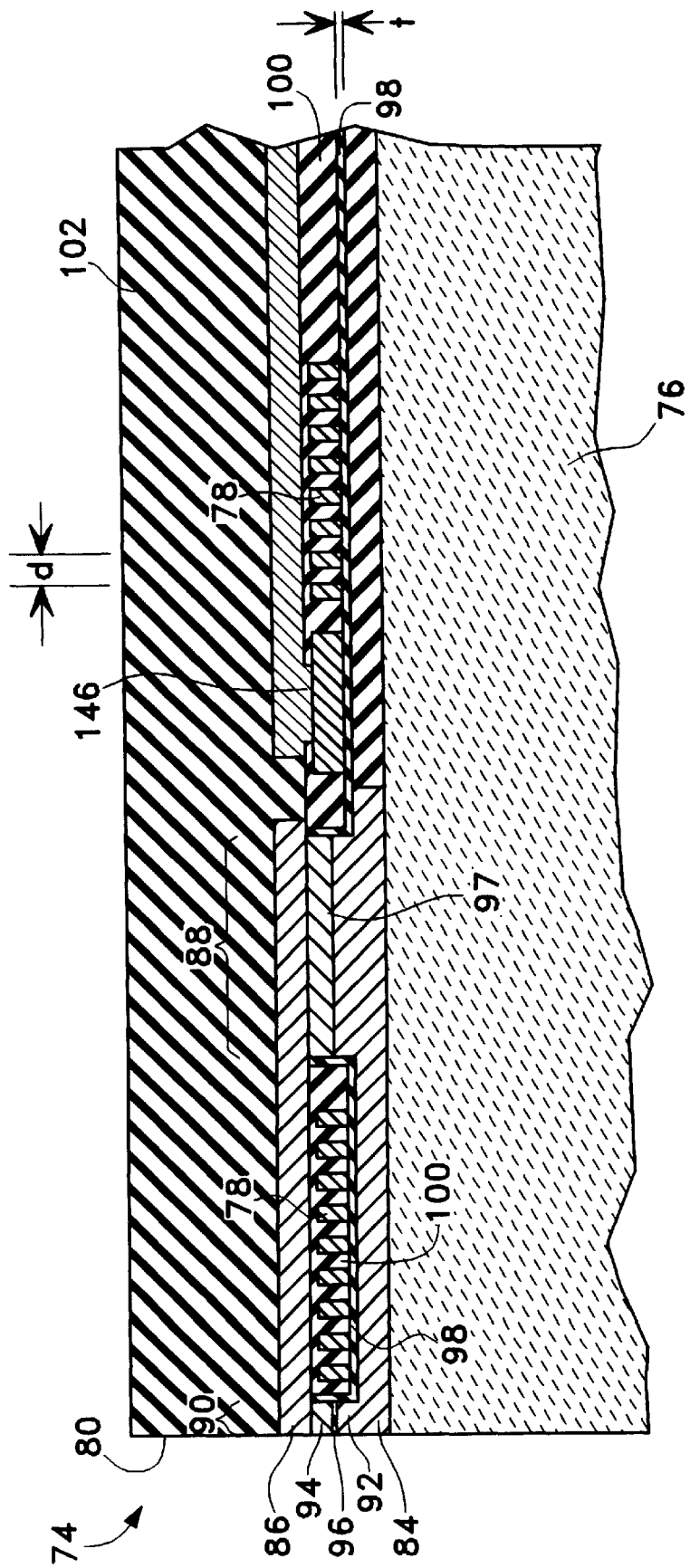
FIG. 9 is a cross-sectional side view taken along the line 9—9 of FIG. 6.
Figure 10:
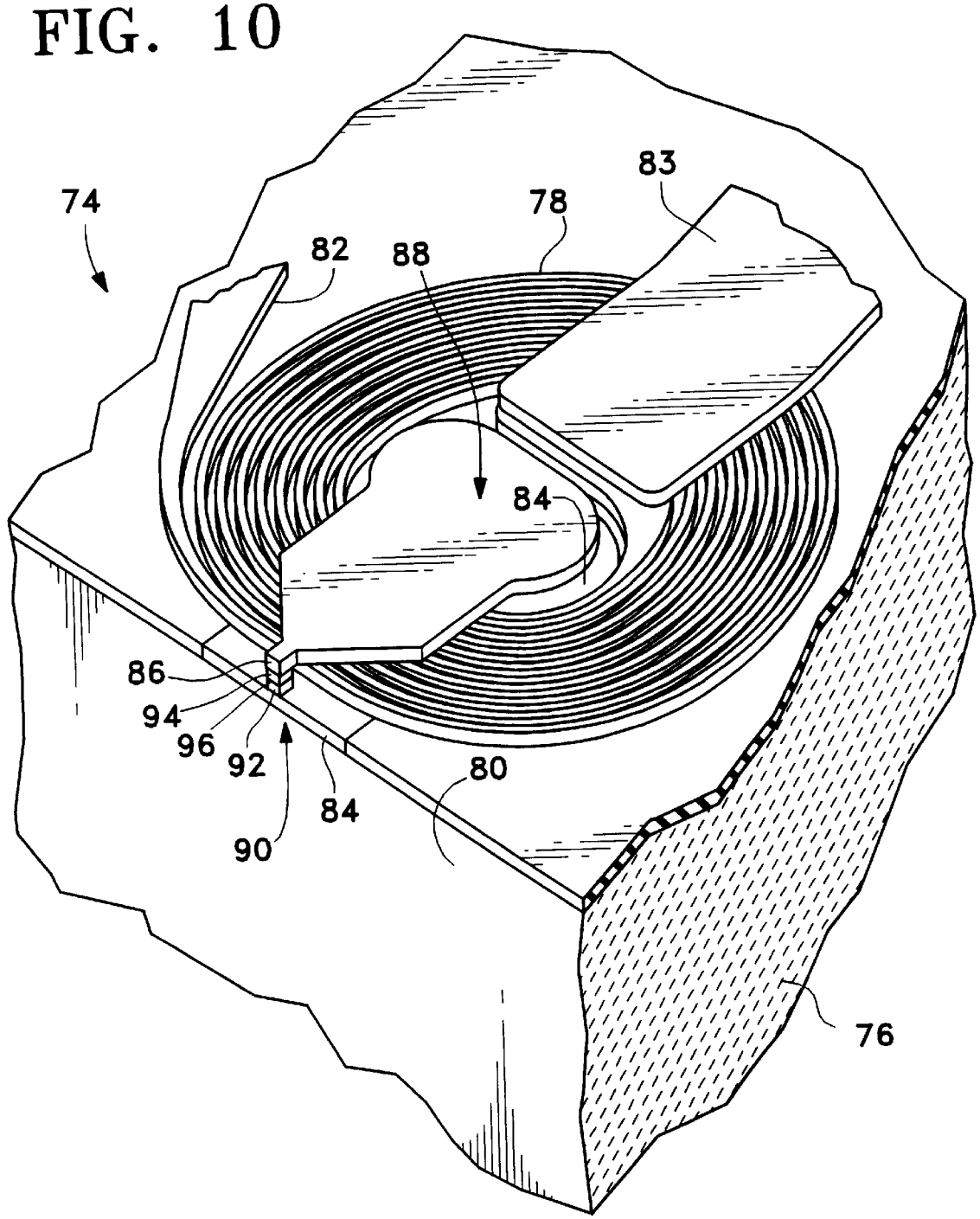
FIG. 10 is a perspective view, partially broken away, illustrating the relative position of the layers of the magnetic head of the invention.

FIGS. 7–11 show the first embodiment of the invention. The magnetic head of this embodiment is an inductive head 74. FIG. 7 is the top elevational view of the magnetic head 74. FIGS. 8 and 9 are cross-sectional side views taken along the lines 8—8 and 9—9, respectively, of FIG. 7. FIG. 10 is a perspective view, partially cut-away, showing the relative relationship of the constituent layers of the head 74. FIG. 11 is a overall view of the head 74 as part of the slider 52. For the sake of illustration, the protective and insulating layers in FIGS. 7, 10 and 11 are removed exposing the relevant components of the magnetic head 74. However, the protective and insulating layers are shown in FIGS. 8 and 9.

The magnetic head 74 can be built on a substrate 76 preferably made of a material that is nonmagnetic and nonconducting, such as ceramic. The substrate can be an integral part of the slider 52 (FIGS. 6 and 11). Above the substrate 76 is a first yoke layer 84. A coil 78 that is encompassed by insulation 98 and 100 is sandwiched between the first yoke layer 84 and a second yoke layer 86 (FIG. 9).

The first and second yoke layers 84 and 86 of the magnetic head 74 form a closed magnetic path through a back closure region 88 and a tip region 90. The back closure region 88 includes a feedthrough 97 (FIG. 9) joining the first yoke layer 84 and the second yoke layer 86. The tip region 90 comprises first and second pole tip layers 92 and 94 separated by a transducing gap layer 96. During data writing, current passing through the coil 78 induces magnetic flux in the yoke layers 84 and 86, the induced magnetic flux passes through the closed magnetic path, reaching the gap layer 96 and magnetizes the disk surface 72 (FIG. 7). During data reading, magnetic flux emanating from the recording medium 72 is intercepted by the transducing gap 96. The intercepted magnetic flux flows along the continuous magnetic path defined by the two yoke layers 84 and 86 and induces electrical current in the inductive coil 78. The induced current in the coil corresponds to the data signals stored on the recording medium 72.

The coil 78 is dielectrically insulated from the first and second yoke layers 84 and 86 by dielectric layers 98 and 100. The dielectric layer 98 is thinly deposited over the substrate 76. The dielectric layer 98 has a thickness t (FIG. 9) which is thinner than the total height of pole tip layers 92 and 94 and the gap layer 96. The gap layer 96 is also made of dielectric material. An insulating overcoat layer 102 deposited atop of the second yoke layer 86 physically protects the magnetic head 74. In this embodiment, the dielectric material for the layers 98, 100, 96 and 102 is alumina ($Al_2O_3$). Alternatively, other insulating materials such as silicon dioxide ($SiO_2$), silicon nitride ($Si_3N_4$), aluminum nitride (AlN) or diamond-like-carbon (DLC) can also be used as substitutes.

The material for the first and second yoke layers 84 and 86, and the first and second pole tip layers 92 and 94 is preferably selected to be a material having a high magnetic moment, or a "high Bsat material." Exemplary materials are cobalt zirconium tantalum alloy (CoZrTa), cobalt zirconium niobium alloy (CoZrNb), and iron tantalum niobium alloy (FeTaNb). The choice of high magnetic moment material for the layers 84, 86, 92 and 94 is to prevent premature magnetic saturation of the magnetic head 74 during data writing. Writing recording medium with high coercivity necessitates the use of higher writing current. Higher writing current generates higher magnetic flux which in turn drives the yoke layers 84 and 86 and the pole tip layers 92 and 94 into a higher state of magnetization. At still higher driving current through the coil, a point may be reached in which the yoke layers 84 and 86 and the tip layers 92 and 94 can no longer be responsive to the corresponding increase in driving flux. The layers are then said to be in a state of magnetic saturation. Premature magnetic saturation in these layers would render the head 74 incapable of writing signals on media with high coercivity.

By employing a high Bsat material for the layers 92 and 94, which material exhibits both higher saturation magnetization and electrical resistivity in comparison to currently used Permalloy (an alloy having an approximate composition of 80Ni:20Fe), a head of the invention can be extended to applications at higher data rates and higher areal densities. The higher saturation magnetization allows operation with higher coercivity media. The higher resistivity extends the maximum useful operating frequencies to higher values by reducing the eddy current losses at higher frequencies.

A significant feature of the second yoke layer 86 of the invention is its substantially level or planar cross-sectional profile as shown in FIGS. 7–10. Making the second yoke layer 86 topographically flat provides several benefits. For example, the problems arising from step coverage commonly encountered in thin film processing as described above are avoided. The planar profile is also advantageous in the formation of a merged head in which the read transducer is formed above the second yoke layer 86, as will be explained later in the description of the second embodiment.

Another key feature of the head 74 is the use of a single layer coil 78. This structure allows the critical masking and pattern definition processes for the coil 78 to be performed on a highly planar surface which permits a very small distance between centers of adjacent coil turns, or "coil pitch", shown as a dimension P on FIG. 7. For example, the coil pitch for a head of the invention can be in the range of 1 to $3\mu$, which is approximately half the coil pitch of prior art write heads. This small coil pitch enables the significant reduction of physical dimensions of other key features of the head that results in the substantial reduction of the total head inductance.

For example, the width and length of yoke 84, shown as dimensions W and L respectively in FIG. 7, can be reduced. A yoke width of head 74 can be reduced to the range of 5 to $10\mu$, which is again about ten percent (10%) of the width of prior art yoke widths. Further, the yoke length of head 74 can be reduced to the range of 10 to $20\mu$, which is less than half of prior art yoke lengths. These size reductions also result in the area of the back closure region 88 to be reduced to in the range of 200 to $300\mu^2$, which is only about twenty percent (20%) of prior art back gap closure areas. These reductions result in total inductance for a head of the invention of approximately 10 to 20 nH, which enables a significant improvement in the speed at which the head can switch write currents, e.g. to 500 Mb/sec or more.

These size reductions in the yoke width and length also improve overall magnetic efficiency by reducing losses due to the skin effect. This follows from basic magnetic recording theory that head efficiency can be approximated by the ratio of the magnetic reluctance of the recording gap region to the magnetic reluctance of the entire magnetic structure, i.e., gap and magnetic yokes and poles. As the frequency of operation is increased, the magnetic skin depth decreases, so the effective cross section area through which the writing flux must pass also decreases. This effect increases the magnetic reluctance per unit length of the yoke structure, thereby reducing the overall head efficiency. This effect can be compensated by decreasing the overall length of the yoke structure, thereby decreasing its contribution to the magnetic reluctance and, therefore, restoring the head efficiency to a higher value.

This loss in head efficiency could, in principle, also be improved by increasing the width of the yoke structure, which increases the effective cross section of the path through which the magnetic flux can flow. However, this approach also increases the cross section area of the leakage paths between the two yokes comprising the write head structure, which thereby increases the overall head inductance. Since this is not a desirable consequence, the preferred embodiment would be to make the yokes as narrow as possible consistent with the application requirements, and recover the loss of efficiency by making the yoke structure shorter, as described herein.

Figure 1:
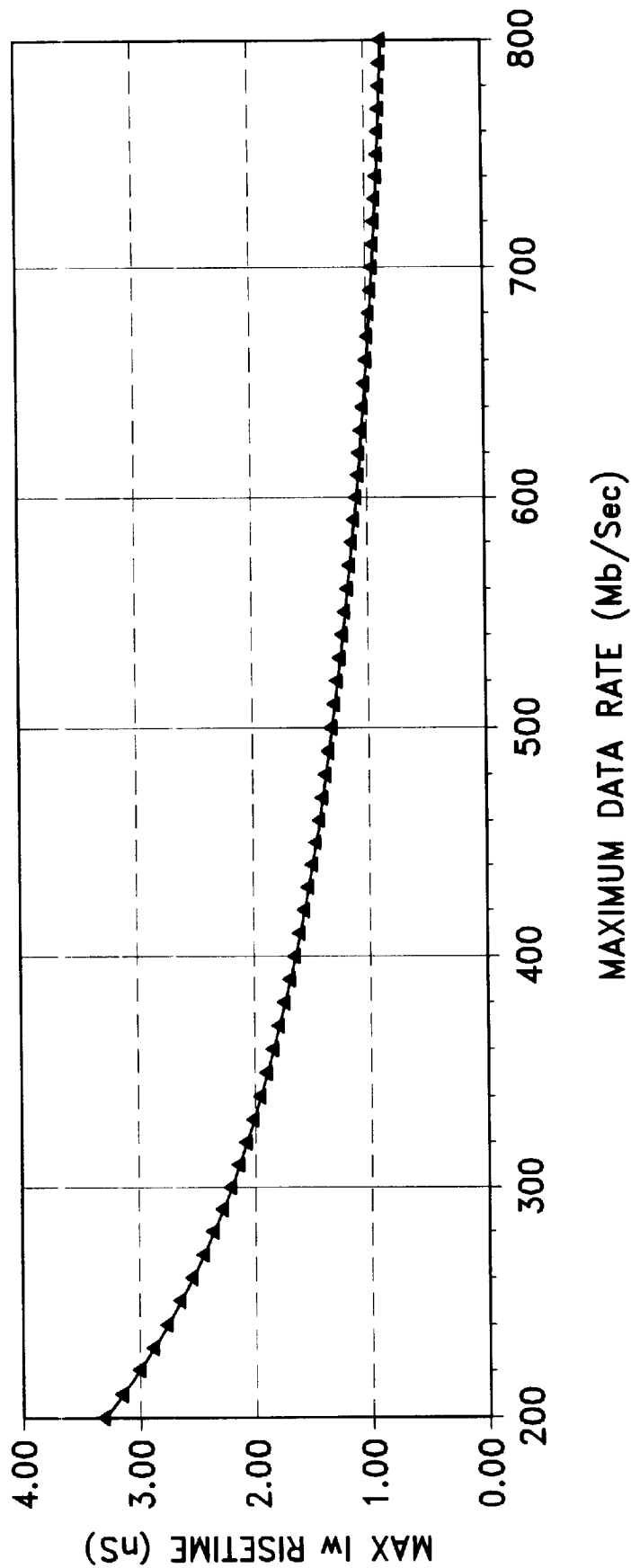
FIG. 1 is a graph of estimated maximum current risetimes versus desired data rates.
Figure 2:
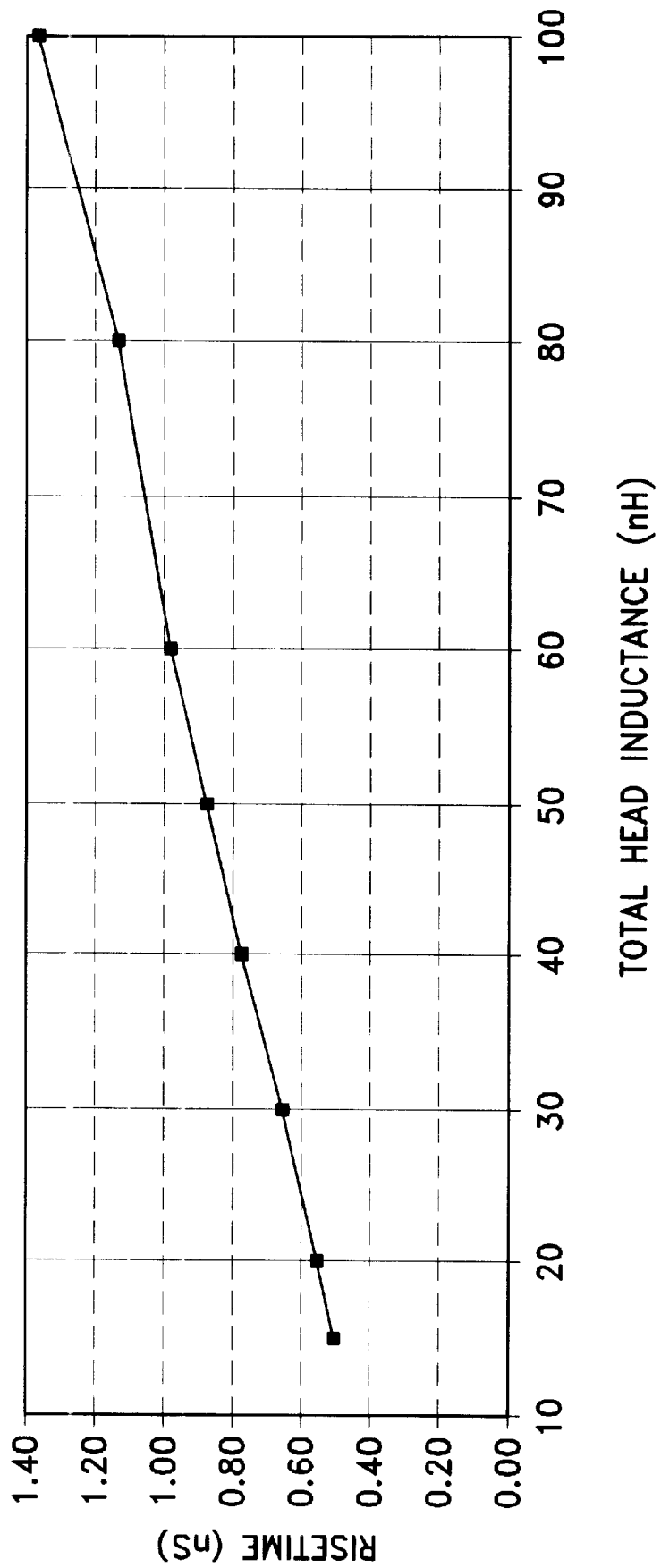
FIG. 2 is a graph of current risetimes versus total inductances.
Figure 3:
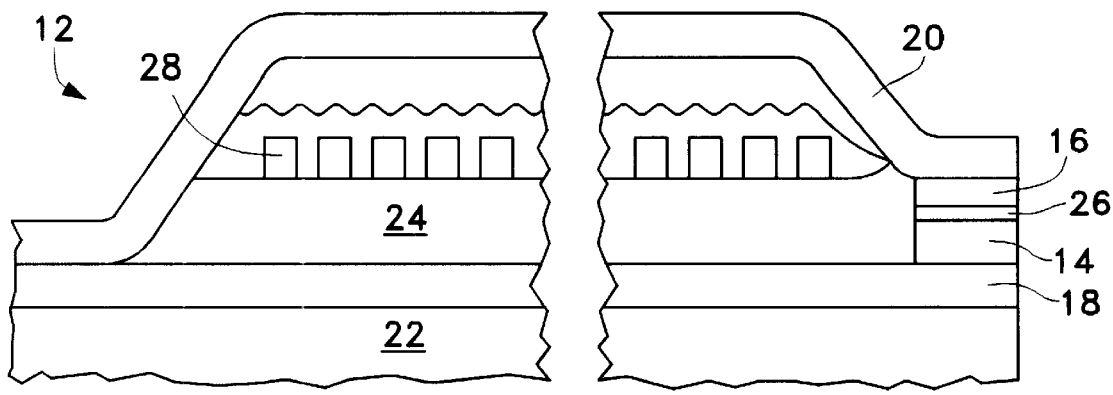
FIG. 3 is a cross-sectional side view of a prior art magnetic head having a second yoke layer with a relatively high profile curvature.
Figure 4:
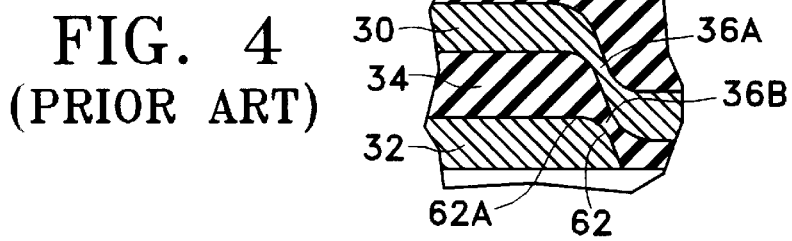
FIG. 4 is a cross-sectional view of a prior art thin film structure schematically illustrating the problem of step coverage encountered during thin film product processing.

Yet another key feature of the head 74 are the first and second pole tip layers 92 and 94, which are formed in a "pedestal" shape. As with the pole tip layers 14 and 16 (FIG. 3), layers 92 and 94 minimize the sensitivity of the head performance to final lapped throat height.

FIG. 12 shows a variation of the magnetic head 74 implemented with laminated first and second yoke layers 84 and 86 respectively. In the first yoke layer 84, an insulating layer 104 is sandwiched between two sub-layers 84A and 84B. Likewise, in the second yoke layer 86, another insulating layer 106 is interposed between two sub-layers 86A and 86B. Laminating the yoke layers 84 and 86 prevents the formation of eddy currents during high frequency operations. An exemplary eddy current path 108 is shown in FIG. 12. Eddy currents can flow along the path 108 if the insulating layer 106 is absent. Eddy currents arise mainly in response to oppose any magnetic flux changes in accordance with Lenz's law. Formation of eddy currents is undesirable because it diminishes the intercepted flux during data reading and the driving flux during data writing, and thereby converts and dissipates the flux as wasteful heat. The eddy current effect, especially experienced in high frequency applications, can be prevented by laminating the yoke layers 84 and 86 as shown in FIG. 12.

Figure 13:
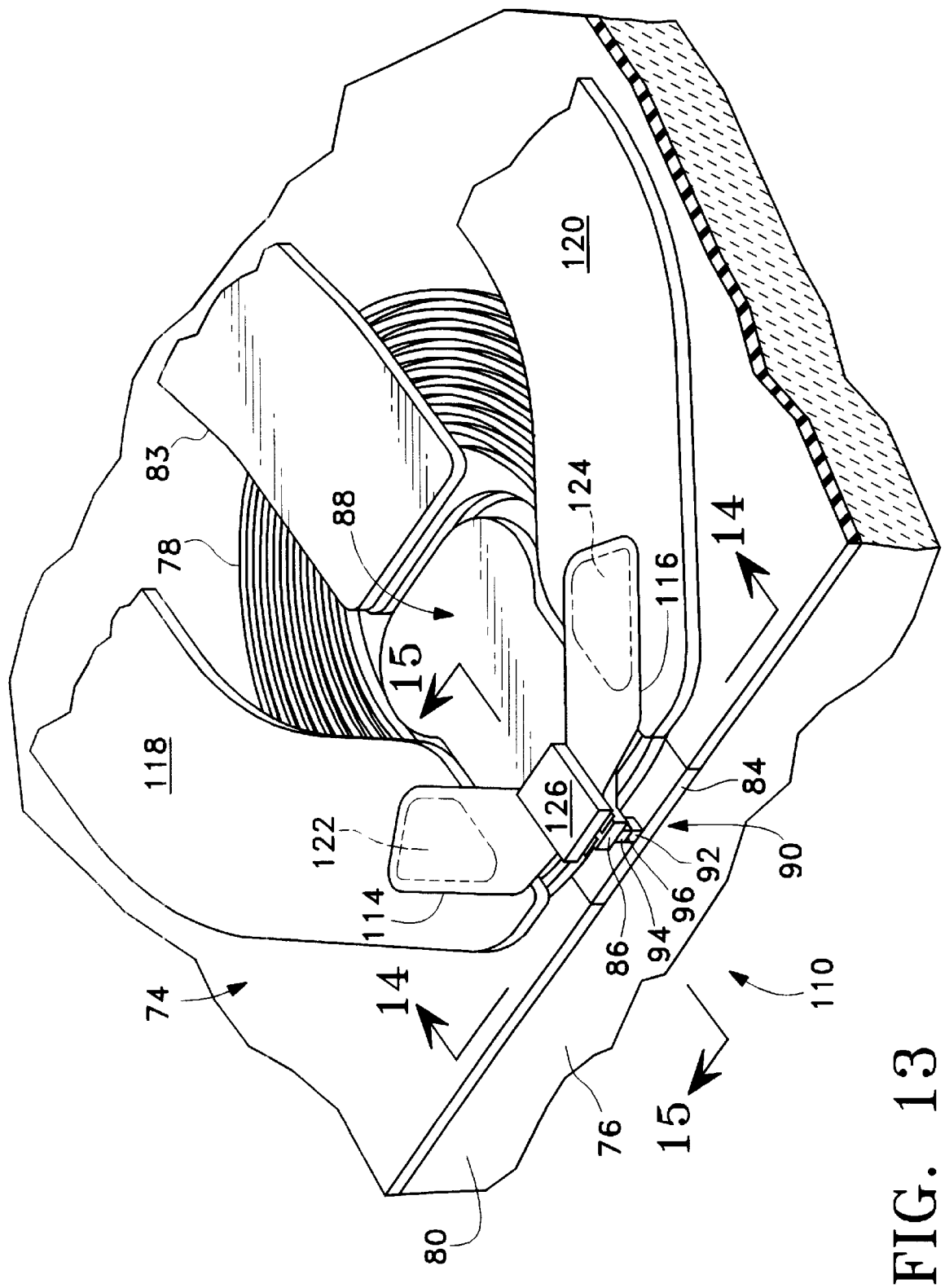
FIG. 13 is a perspective partial view of the second embodiment of the invention fabricated as a merged head with the read transducer disposed above the write transducer.
Figure 14:
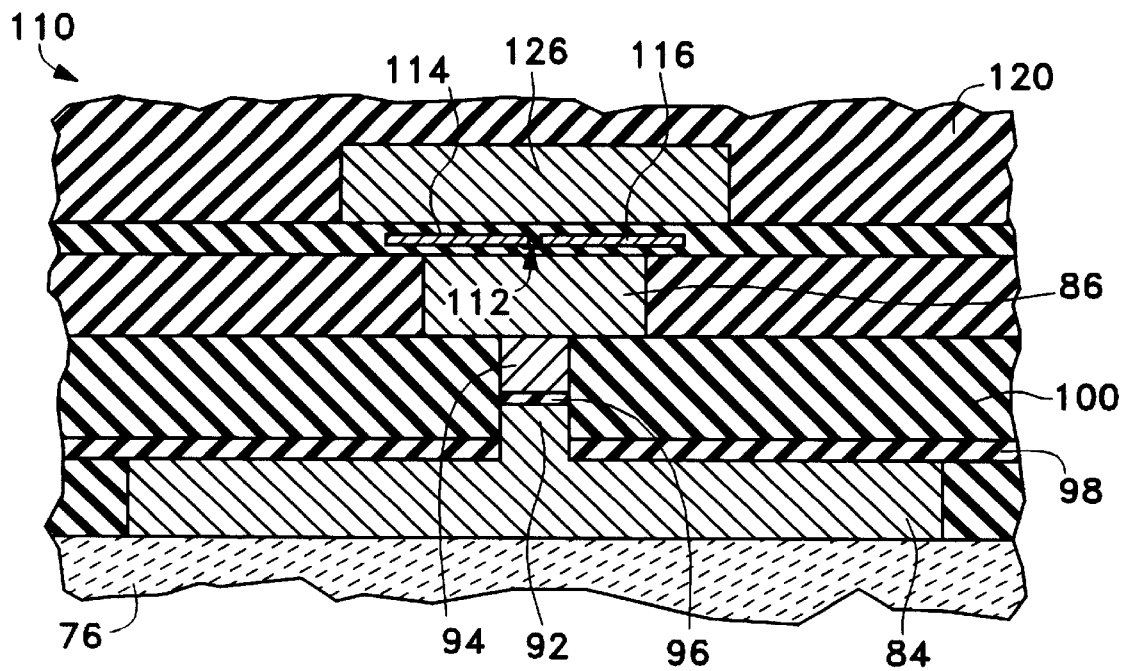
FIG. 14 is a cross-sectional front view taken along the line 14—14 of FIG. 13.
Figure 15:
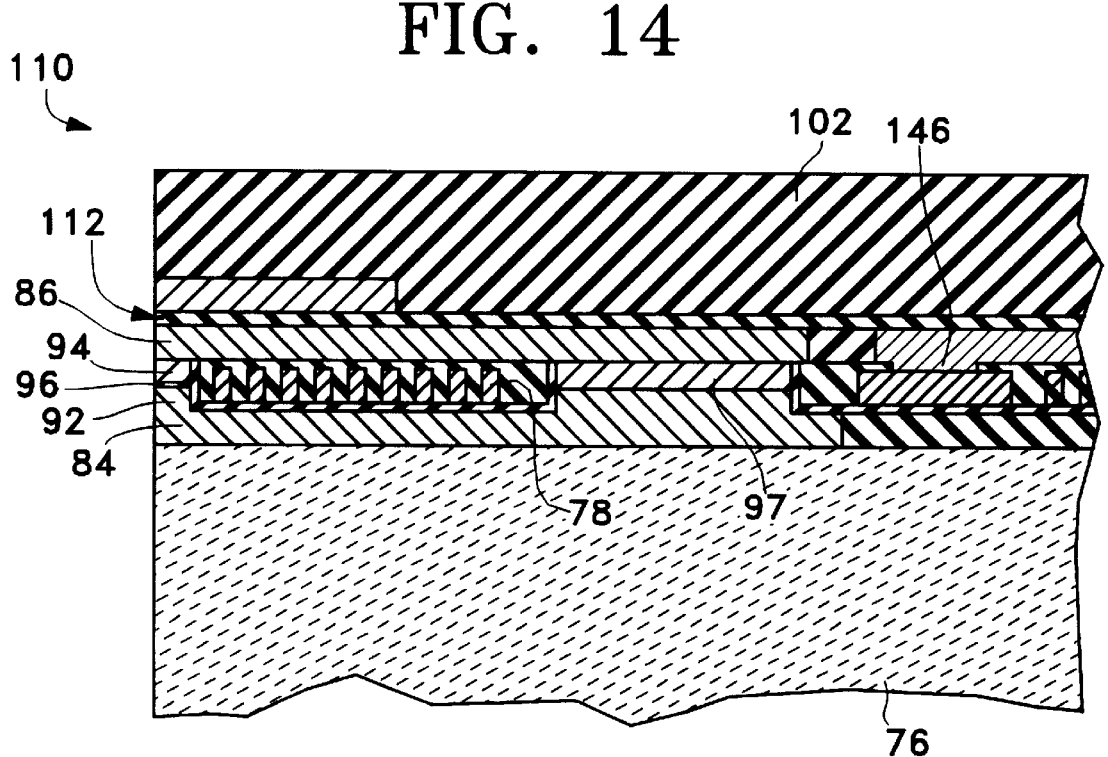
FIG. 15 is a cross-sectional side view taken along the line 15—15 of FIG. 13.

FIGS. 13–15 show a second embodiment of the invention of a magnetic head 110. FIG. 13 is a perspective view, partially cut-away, showing the relationship of the various layers of the head 110. FIGS. 14 and 15 are cross-sectional side views taken along the lines 14—14 and 15—15, respectively, of FIG. 13. The magnetic head 110 of this embodiment includes a read transducer 112 formed in conjunction with the coil 78 of the write transducer. In this embodiment, the read transducer 112 is a magnetoresistive transducer which can be an anisotropic magnetoresistive (AMR) transducer, or a giant magnetoresistive (GMR) transducer. There is a pair of first level electrical leads 114 and 116 connected to the magnetoresistive transducer 112. The first level leads 114 and 116 are tied to the second level leads 118 and 120 through the vias 122 and 124, respectively. The second level electrical leads 118 and 120 can be coplanar and simultaneously fabricated with the coil lead 83. The magnetoresistive transducer 112 is sandwiched between and dielectrically separated from a pair of magnetic shields 86 and 126. In this embodiment, the layer 86 performs the dual function acting as a yoke layer for the coil 78 and as a shield layer for the read transducer 112.

Figure 5:
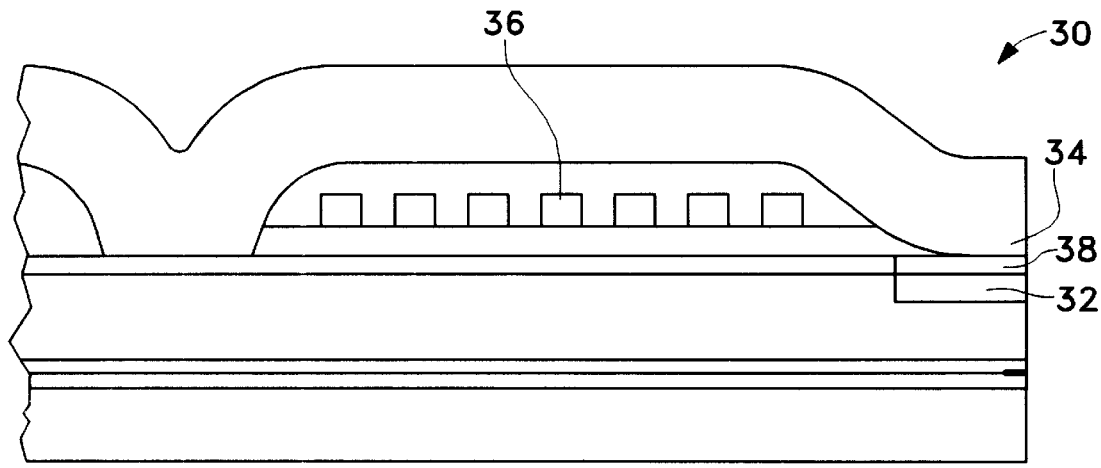
FIG. 5 is a cross-sectional side view of another prior art magnetic head having a second yoke layer with a relatively high profile curvature.

Conventionally, the read transducer is fabricated prior to the write transducer as exemplified by the '747 patent described with reference to FIG. 5. One reason for this structure is that the formation of the magnetoresistive transducer involves laying a number of delicate and ultra thin layers which must be formed over a planar substrate. Depositing the delicate layers associated with the read transducer close to the substrate poses less of a step coverage problem. However, a disadvantage with this approach is that forming the coil with the associated layers subsequently involves several high temperature annealing cycles which may be detrimental to the already formed read transducer with the delicate layers. The magnetic head 110 of the second embodiment eliminates this problem because the flat topographical feature of the second yoke layer 86 enables formation of the read transducer 112 after formation of the coil 78.

Figure 16:
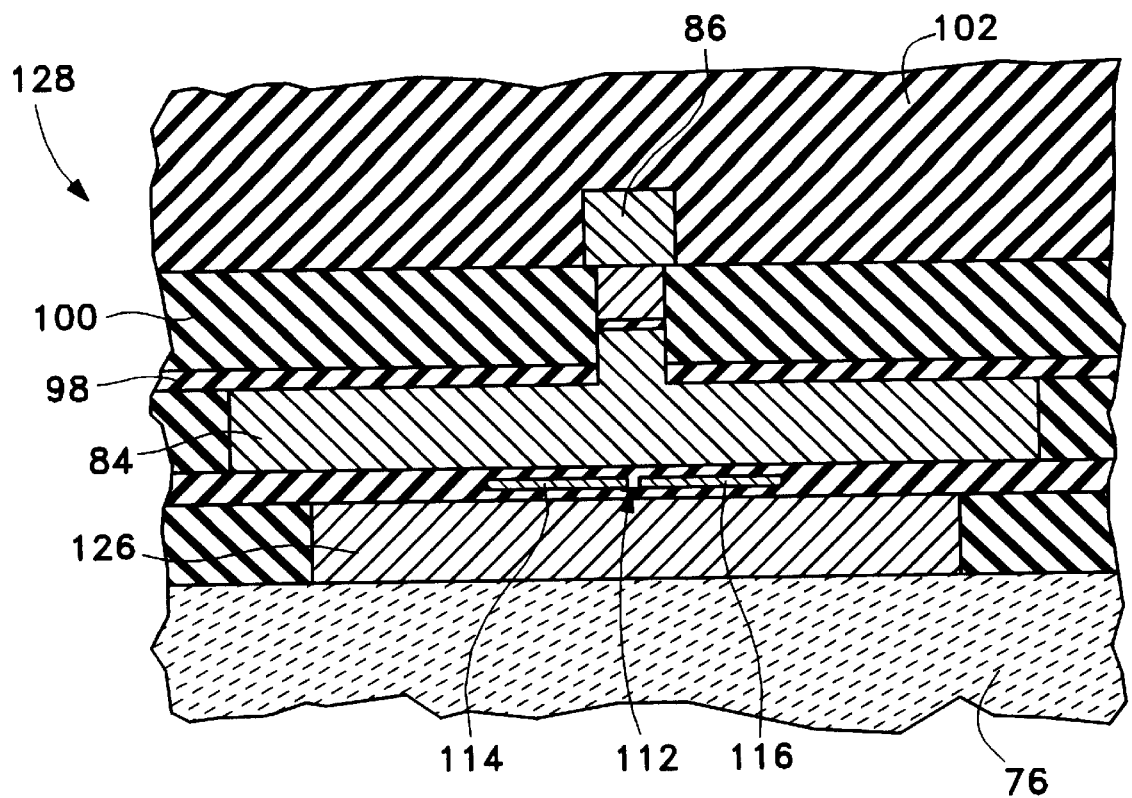
FIG. 16 is a cross-sectional partial front view of the third embodiment of the invention fabricated as a merged head with the read transducer disposed below the write transducer.
Figure 17:
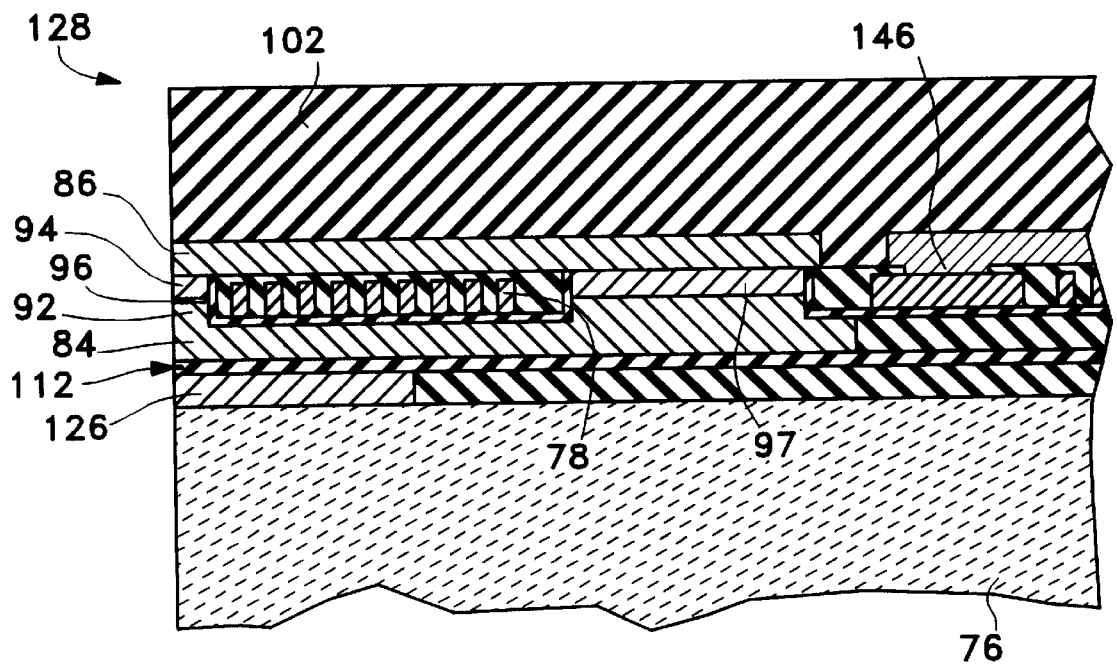
FIG. 17 is a cross-sectional partial side view of the magnetic head shown in FIG. 16.

FIGS. 16 and 17 show a third embodiment of the invention of a head 128. In this embodiment, the read transducer 112 is disposed between the write transducer and the substrate 76. The read transducer 112 can be an anisotropic magnetoresistive (AMR) transducer, or a giant magnetoresistive (GMR) transducer. There is a also a pair of first level electrical leads 114 and 116 connected to the magnetoresistive transducer 112. The second level electrical leads are not shown in FIGS. 14 and 15. As with the second embodiment, the magnetoresistive transducer 112 is sandwiched between and dielectrically separated from a pair of magnetic shields 84 and 126. In this embodiment, the layer 84 performs the dual function as a first yoke layer for the coil 78 and as a shield layer for the read transducer 112. As a merged head, the head 128 does not have the benefits of preventing the read transducer 112 from being subjected to the subsequent high temperature heat annealing cycles, as in the head 110 of the second embodiment (FIGS. 13–15) during manufacturing. Nevertheless, the head 128 is a fully functional head and has the other advantages as described above.

Figure 18G:
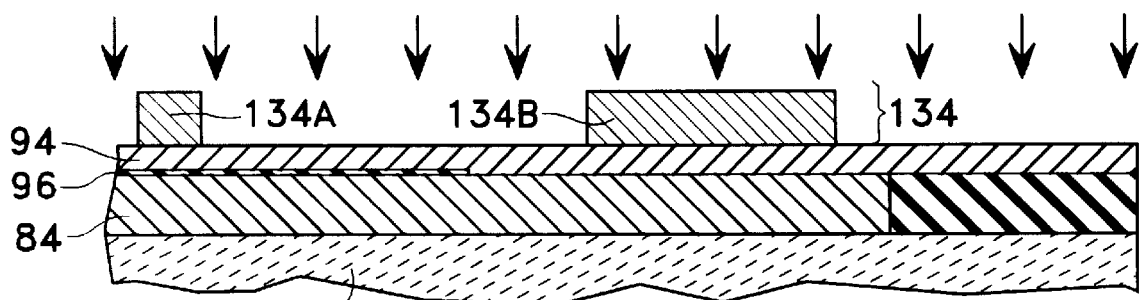
FIGS. 18A–18V are sequential views schematically illustrating the process of forming the magnetic head of the invention as shown in FIG. 7–11.
Figure 18H:
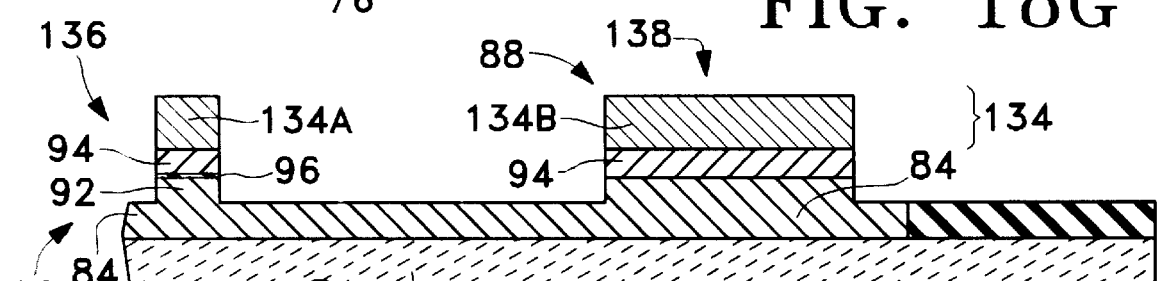
Figure 18I:
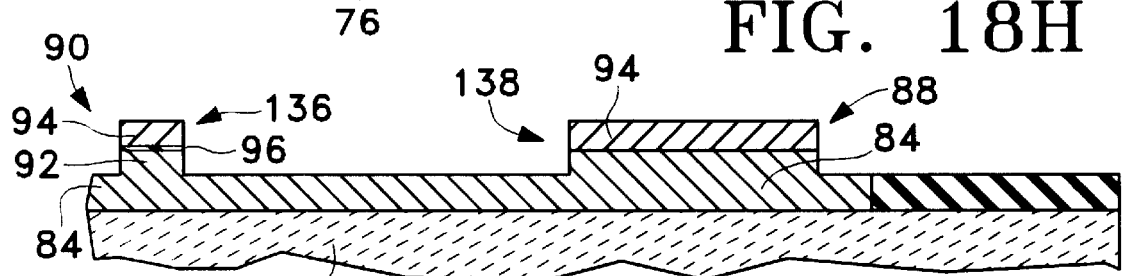
Figure 18J:
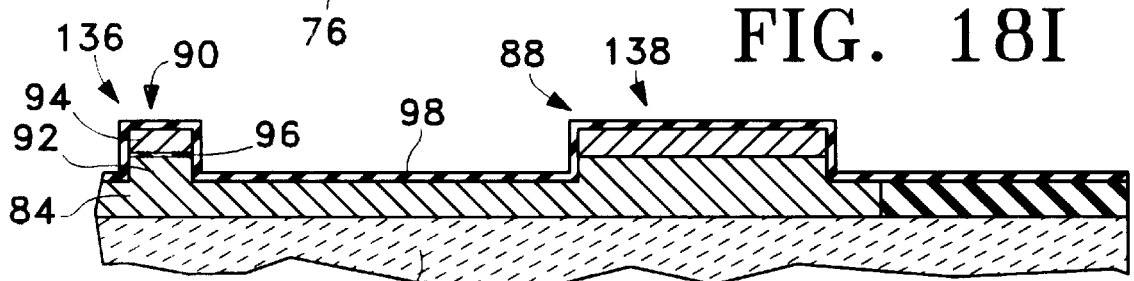
Figure 18K:
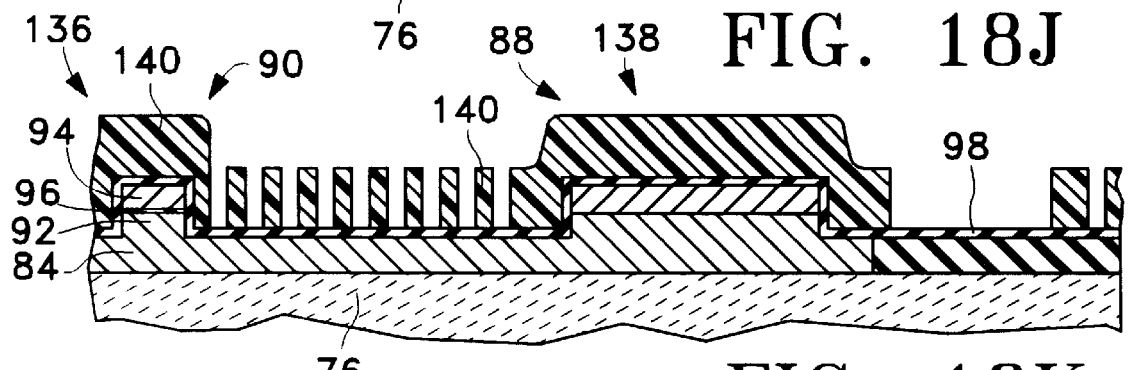
Figure 18L:
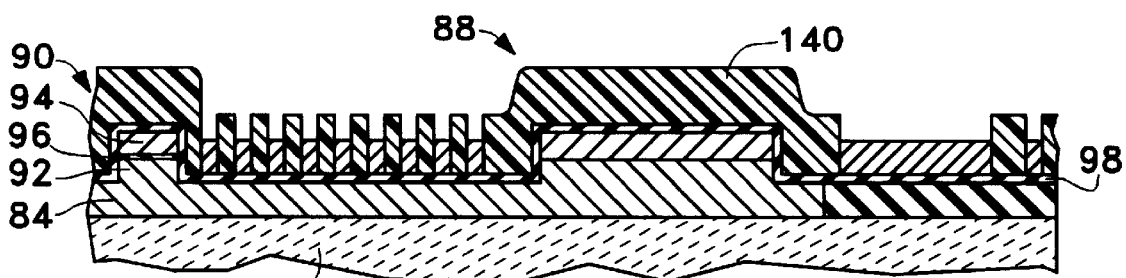
Figure 18M:
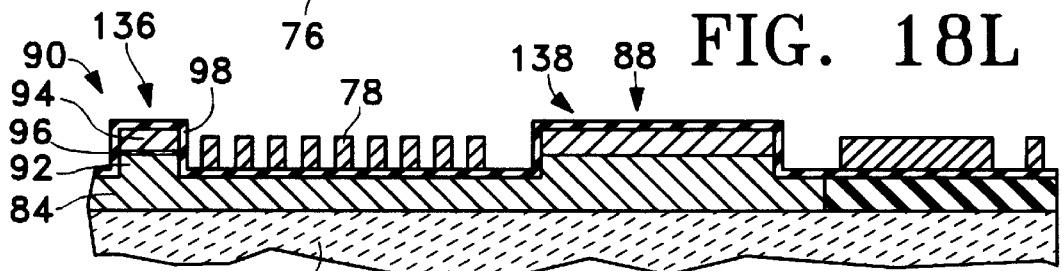
Figure 18N:
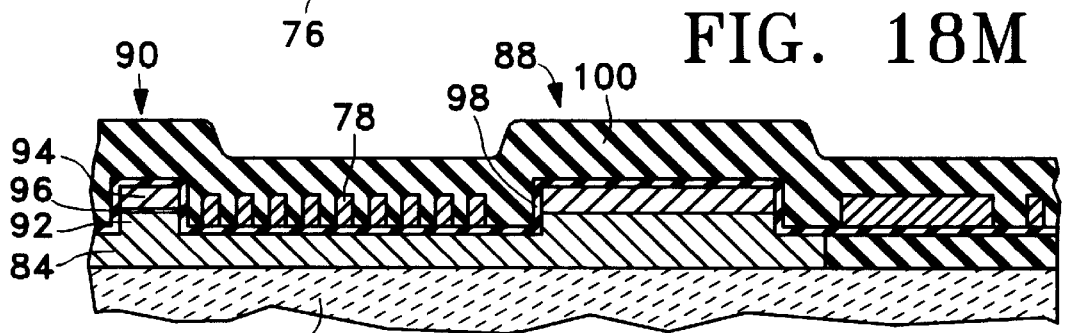
Figure 18O:
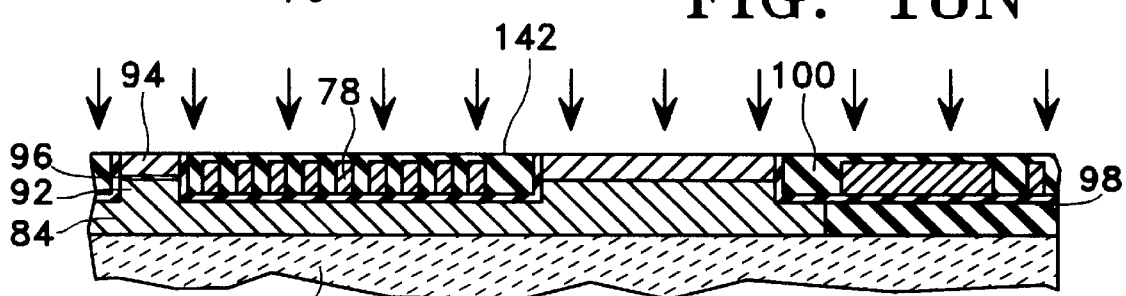
Figure 18P:
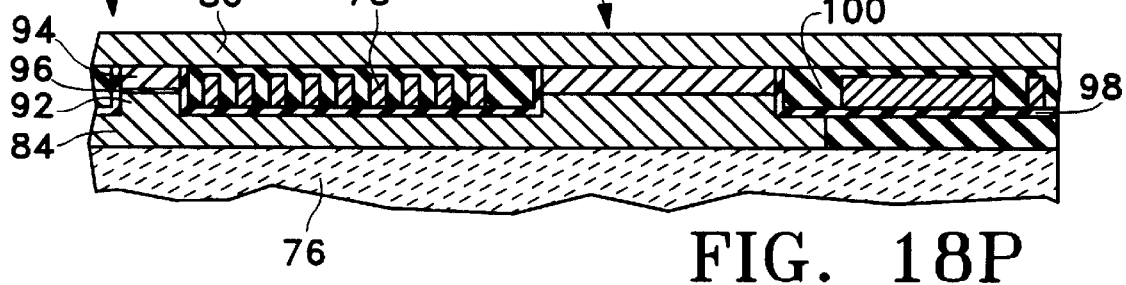
Figure 18Q:
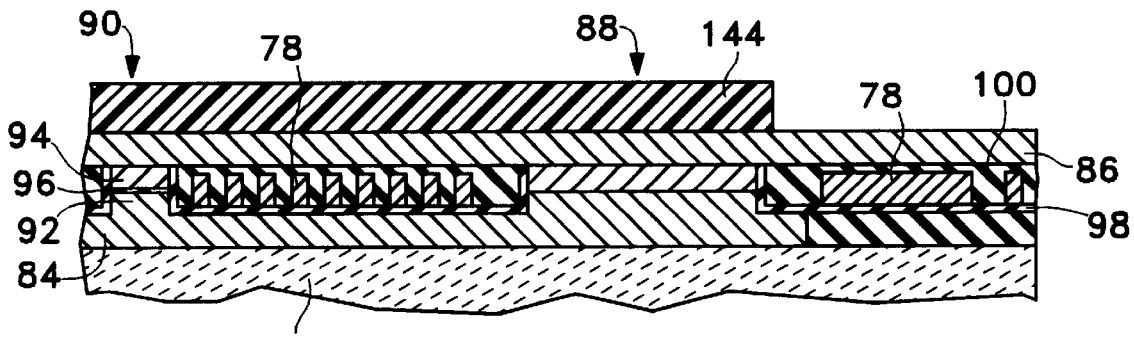
Figure 18R:
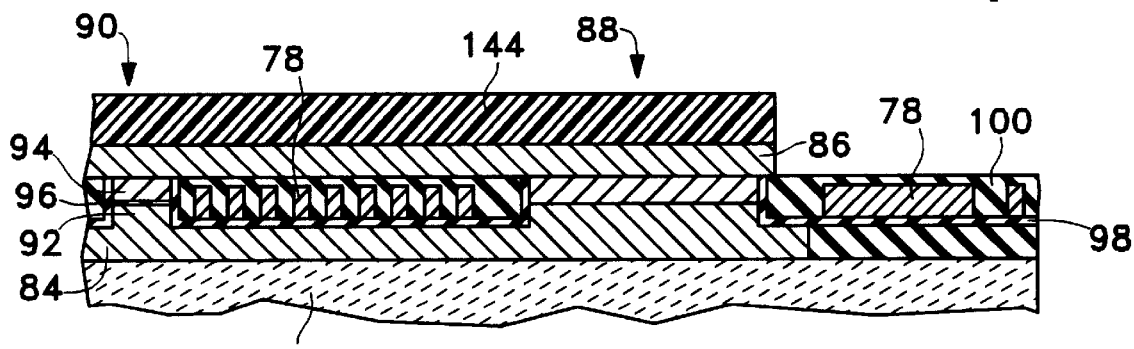
Figure 18S:
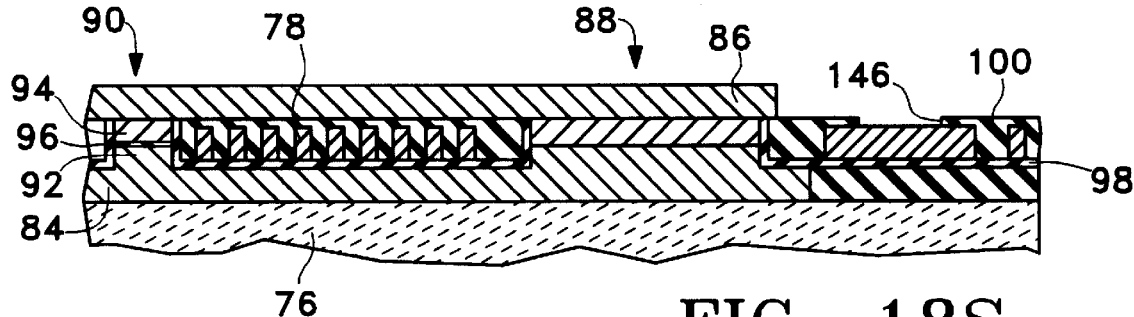
Figure 18T:
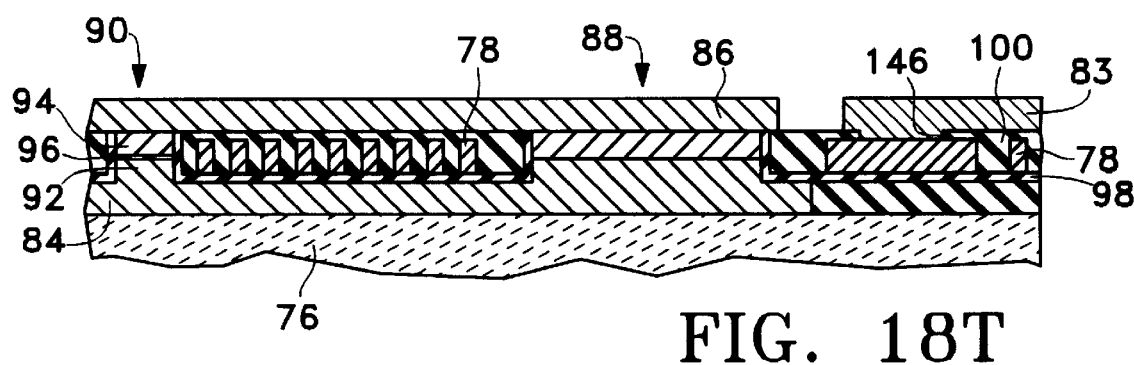
Figure 18U:
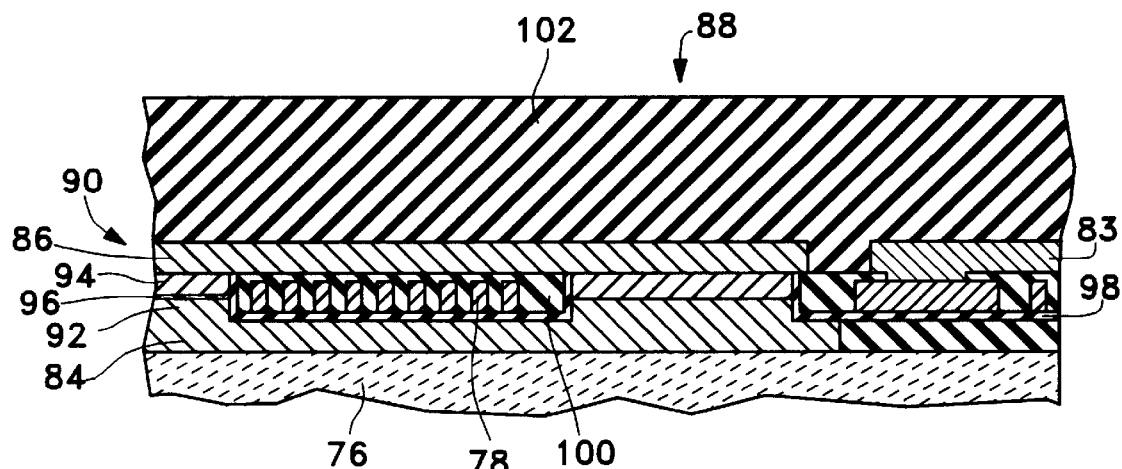
Figure 18V:
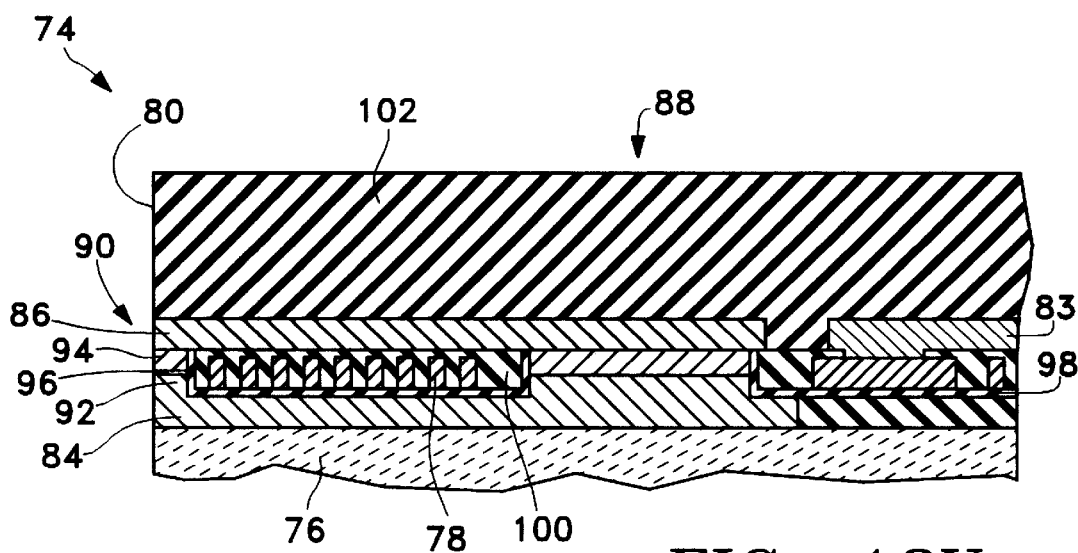

FIG. 18A–18V are sequential views schematically illustrating the fabrication process of the magnetic head 74 of the invention, as shown in FIGS. 7–11.

First a substrate 76 needs to be provided as shown in FIG. 18A. The substrate 76 is preferably a nonmagnetic and electrically insulating material. Suitable materials can be aluminum carbide (AlC), aluminum nitride (AlN), alumina ($Al_2O_3$) or alumina titanium carbide ($Al_2O_3TiC$). A first yoke layer 84 is then deposited onto the substrate 76 by sputtering to a thickness of approximately $1.0\mu$–$7.0\mu$, for example. After patterning of the first yoke layer 84, a dielectric layer 130 is deposited in juxtaposition with the patterned yoke layer 84. The resultant structure after the planarization process is as shown in FIG. 18B.

The material used for the first yoke layer 56 can be any magnetic material with a high permeability and a low coercive force, such as Permalloy. In addition to the above attributes, high Bsat materials can also be used, such as those mentioned previously. In the preferred method, the first yoke layer is formed of high magnetic moment material. It also should be noted that in the preferred method, the first pole tip layer 92 (FIGS. 8 and 9) is integrally formed out of the first pole tip layer 84. As an alternative, a separate pole tip layer can be deposited after the deposition of the first yoke layer 84.

The formation of the transducing gap layer 96 begins with patterning of a photoresist mask 132 onto the first yoke layer 84. Thereafter, a gap layer 96 formed of insulating material such as alumina ($Al_2O_3$) is deposited on the masked substrate as shown in FIG. 18C. The photoresist layer 132 is then removed using a photoresist solvent. The gap layer 96 deposited on top of the photoresist layer 132 is then lifted off along with the removed photoresist material. The resultant structure up to this step is shown in FIG. 18D.

A second pole tip layer 94 is deposited on the structure by sputtering, for example, as shown in FIG. 18E. Another masking layer 134 is then patterned on the top of the second pole tip layer 94, as shown in FIG. 18F. In this method, the material for the masking layer 134 is Permalloy. Alternatively, photoresist can be used as a substitute material for the masking layer 134. In that case, the photoresist material can be directly patterned onto the second pole tip layer 94 but needs to be deposited at a larger thickness as an etchant shield for the subsequent etching process.

Relying on the masking segments 134A and 134B of the masking layer 134 as shields, the structure undergoes an etching process. Either the method of ion milling or reactive ion beam etching (RIBE) can be employed to etch away the unwanted portions of the gap layer 96 and the magnetic layers 94 and 84 as shown in FIG. 18G. After etching to a predetermined depth, the resulting structure up to this step is shown in FIG. 18H. In essence, stacks 136 and 138 are formed above the substrate 76. It should also be noted that at this point, the first pole layer 92 is defined and is an integral part of the first yoke layer 84. The first pole tip layer 92 is also separated from the second pole tip layer 94 by the gap layer 96 in the stack 136 at the pole tip region 90. However, the first yoke layer 84 is in contact with the second pole tip layer 94 in the stack 138 at the back closure region 88. The masking layer 134 is then removed, which results in formation of stacks 136 and 138 shown in FIG. 18I.

Through the process of either sputtering or plasma enhanced chemical vapor deposition (PECVD), a first insulating layer 98 is coated onto the substrate 76 and over the stacks 136 and 138. In the preferred method, the insulating layer 98 is sputtered over and around the stacks 136 and 138 to a thickness of approximately $0.5\mu$ to $1\mu$. As shown in FIG. 18J, the thickness of the insulating layer 98 is substantially thinner than the thickness of the stacks 136 and 138.

The formation of the coil layer 78 begins with sputtering of a thin layer of copper (not shown), called the seed layer, onto the first insulating layer 98. Then, a photoresist layer 140 is patterned onto the seed layer (not shown) as shown in FIG. 18K. A conductive metal layer 141, such as copper, is formed on the patterned photoresist layer 140 as shown in FIG. 18L. The photoresist layer 140 is thereafter removed, resulting in the formation of the coil layer 78 disposed above the substrate 76 and adjacent to the stack 136 as shown in FIG. 18M. The copper seed layer is then etched away by lightly dipping the substrate 72 with the copper seed layer in an etchant bath.

A second insulating layer 100 of dielectric material is then deposited onto the coil layer 78 by either the PECVD method or the sputtering method. As with the first insulating layer 98, the material for the second insulating layer 100 can be selected from a variety of insulating materials such as alumina ($Al_2O_3$), silicon dioxide ($SiO_2$), silicon nitride ($Si_3N_4$), aluminum nitride ($AlN_4$) or diamond-like-carbon (DLC). The resultant structure up to this step is as shown in FIG. 18N.

The structure is then subjected to a two-step leveling process in which the second insulating layer 100 is planarized by mechanical lapping with the assistance of a slurry which may include alumina ($Al_2O_3$) or silicon dioxide ($SiO_2$) for gross material removal. Thereafter, ion milling is employed for the removal of material to a fine level, thereby exposing the second pole tip layer 94 on a level surface 142 as shown in FIG. 18O.

A second yoke layer 86 is deposited atop the level surface 142. As shown in FIG. 18P, part of the second pole yoke layer 86 is in contact with the second pole tip layer 94 at the pole tip region 90. Another part of the second yoke layer 86 is in contact with the first yoke layer 84 at the back closure region 88. Depositing the second yoke layer 86 on the level surface 142 results in the second yoke layer 86 being basically flat in cross-sectional profile.

The lateral shape and dimension of the second yoke layer 86 is then formed. First, a photoresist mask 144 is patterned on the top of the second yoke layer 86 as shown in FIG. 18Q. Using the photoresist mask 144 as a shielding template, either a dry or wet etch method is employed to define the second pole tip layer 86 as shown in FIG. 18R.

The photoresist mask 144 is thereafter removed. Again, using the conventional photolithography technique, a via opening 146 is formed through the insulating layer 100 exposing a contact portion of the coil 78. The resultant structure up to this step is as shown in FIG. 18S.

An electrical lead 83 is then patterned onto the via opening 146 and onto the insulating layer 100. The electrical lead 83 provides electrical contact to the coil 78 through the via opening 146. The resultant structure up to this step is shown in FIG. 18T.

An overcoat layer 102 is deposited onto the structure. The material used for the overcoat layer can be any insulating material such as alumina ($Al_2O_3$). The resultant structure after the deposition of the overcoat layer 102 is as shown in FIG. 18U.

A final lapping step is performed on the tip portion 90 of the magnetic head 74 for the purpose of securing a smooth air bearing surface (ABS) 80 as shown in FIG. 16V.

The formation of a merged head, such as the head 110 with the read transducer positioned above the write transducer, illustrated in FIGS. 13 to 15; or the head 128 with the read transducer disposed below the write transducer, illustrated in FIGS. 16 and 17, involves extra steps of forming the read transducing element with its associated layers. The read transducer is formed using conventional methods.

Finally, other variations are possible within the scope of the invention. Described in the fabrication process are the yoke layers 84 and 86 formed without any lamination. As mentioned before, the formation of the first and second yoke layers 84 and 86 can be laminated. That is, the deposition of the first and second yoke layers 84 and 86 can involve the substeps of depositing the laminated layers as shown in FIG. 12. Materials used for the magnetic head of the invention need not be restricted as described. Other materials can well be used as substitutes. For example, the dielectric material for the insulating layers 98 and 100 need not be alumina. In addition to other insulating materials as previously recited, hard-baked photoresist can be used. These and other changes in form and detail may be made therein without departing from the scope and spirit of the invention.

What is claimed is:

1. A merged magnetic head comprising:

a substrate;

an inductive write transducer formed above said substrate comprising a first yoke layer disposed above said substrate;

a second yoke layer disposed above said first yoke layer, said second yoke layer being substantially flat and with a substantially level cross-sectional profile;

an electrical coil disposed between said first and second yoke layers;

a planar thin layer of insulation material disposed between said first and second yoke layers, said insulation material encompassing said electrical coil;

pole tip layers disposed between said first and second yoke layers;

a transducing gap disposed between said pole tip layers; and a magnetoresistive read transducer formed with said inductive write transducer, wherein said first yoke layer also serves as a shield layer for said read transducer.

2. The magnetic head as set forth in claim 1 wherein said insulation material is formed as a layer over said first yoke layer, said insulation layer having a planar surface, said insulation layer being thinner than the total thickness of said pole tip layers, and wherein said coil is disposed over said planar surface.

3. The magnetic head as set forth in claim 1 wherein said yoke layers are formed of high magnetic moment material.

4. The magnetic head as set forth in claim 1 wherein said yoke layers are formed of a material selected from a group consisting of cobalt zirconium tantalum alloy (CoZrTa), cobalt zirconium niobium alloy (CoZrNb), and iron tantalum niobium alloy (FeTaNb).

5. A merged magnetic head as in claim 1, wherein said plurality of windings have a coil pitch in the range of 1–3 microns.

6. The magnetic head as set forth in claim 1, wherein said first and second yoke layers are disposed above said read transducer.

7. The magnetic head as set forth in claim 6 wherein said read transducer is a giant magnetoresistive transducer.

8. The magnetic head as set forth in claim 6 wherein said read transducer is an anisotropic magnetoresistive transducer.

9. The magnetic head as set forth in claim 1 wherein each of said first and second yoke layers includes at least one layer of insulating material laminated between two layers of high magnetic moment material.

10. The magnetic head as set forth in claim 1 wherein said substrate includes a read transducer prefabricated thereon, wherein said first and second yoke layers are disposed above said read transducer.

11. A merged magnetic head as in claim 1, wherein said first yoke layer serves as a shield for said read transducer.

12. A merged magnetic head comprising:

a substrate;

a first laminated yoke layer having first and second surfaces, said first surface being disposed in contact with said substrate, said second surface having a first pole tip integrally formed thereon;

a second laminated yoke layer having third and fourth surfaces, said fourth planar surface being disposed farther away from said substrate than said third planar surface; said third surface having a second pole tip attached thereon; and a gap layer disposed between said first and second pole tips;

wherein said second yoke layer includes a substantially level cross-sectional profile with substantially flat third and fourth surfaces, said first and second yoke layers being disposed substantially parallel to each other and having said second and third surfaces, respectively, encompassing a coil which is dielectrically separated from said first and second yoke layers;

wherein the yoke width of said magnetic head is in the range of 5 to 10 microns and the yoke length of said magnetic head is in the range of 10 to 20 microns.

13. The magnetic head as set forth in claim 12 further including a read transducer disposed above said second yoke layer.

14. The magnetic head as set forth in claim 12 wherein said substrate includes a read transducer thereon, wherein said first and second yoke layers are disposed above said read transducer.

15. The magnetic head as set forth in claim 12 where said first and second yoke layers are formed of high magnetic moment material.

16. The magnetic head as set forth in claim 15 wherein said yoke layers are formed of a material selected from a group consisting of cobalt zirconium tantalum alloy (CoZrTa), cobalt zirconium niobium alloy (CoZrNb), and iron tantalum niobium alloy (FeTaNb).

17. The magnetic head as set forth in claim 12 wherein each of said first and second yoke layers includes at least one layer it of insulating material laminated between two layers of high magnetic moment material.

* * * * *